(12) United States Patent
He et al.

(10) Patent No.: US 9,538,565 B2
(45) Date of Patent: Jan. 3, 2017

(54) HARQ TIMELINES FOR TDD-FDD CARRIER AGGREGATION

(71) Applicant: Intel IP Corporation, Santa Clara, CA (US)

(72) Inventors: Hong He, Beijing (CN); Jong-Kae Fwu, Sunnyvale, CA (US); Seunghee Han, Cupertino, CA (US); Gang Xiong, Beaverton, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 147 days.

(21) Appl. No.: 14/318,143

(22) Filed: Jun. 27, 2014

(65) Prior Publication Data
US 2015/0085713 A1 Mar. 26, 2015

Related U.S. Application Data

(60) Provisional application No. 61/883,127, filed on Sep. 26, 2013.

(51) Int. Cl.
*H04L 5/00* (2006.01)
*H04W 76/02* (2009.01)
(Continued)

(52) U.S. Cl.
CPC .......... *H04W 76/023* (2013.01); *H04L 1/12* (2013.01); *H04L 5/0037* (2013.01); *H04L 5/0048* (2013.01); *H04L 5/0055* (2013.01); *H04L 47/12* (2013.01); *H04L 47/122* (2013.01); *H04L 67/025* (2013.01); *H04L 67/104* (2013.01); *H04W 24/04* (2013.01); *H04W 36/32* (2013.01); *H04W 40/22* (2013.01); *H04W 40/24* (2013.01); *H04W 48/16* (2013.01); *H04W 52/0274* (2013.01);
(Continued)

(58) Field of Classification Search
CPC ....................................................... H04L 5/001
USPC ........................................................ 370/297
See application file for complete search history.

(56) References Cited

U.S. PATENT DOCUMENTS

| 8,932,223 B2 * | 1/2015 | Emelianov | ........... A61B 5/0095 600/407 |
| 9,258,741 B2 * | 2/2016 | Wang | ..................... H04W 28/12 |

(Continued)

OTHER PUBLICATIONS

3GPP TR 36.847, "Study on LTE TDD-FDD Joint Operation Including Carrier Aggregation", 3rd Generation Partnership Project, Technical Specification Group Radio Access Network, Technical Report, Release 12, V1.0.0, Sep. 2013, 12 pages. web page available at: http://www.3gpp.org/dynareport/36847.htm.

(Continued)

*Primary Examiner* — Ricky Ngo
*Assistant Examiner* — Dewanda Samuel
(74) *Attorney, Agent, or Firm* — Stoel Rives LLP

(57) ABSTRACT

Disclosed embodiments include an end-to-end UE and eNB HARQ protocol design for various TDD-FDD joint operation wireless network configurations. Designs for timing of HARQ feedback in response to PDSCH and PUSCH transmissions (or simply, PDSCH and PUSCH) include both HARQ feedback from a UE, and HARQ feedback from an eNB. The PUSCH HARQ timeline embodiments also include both self-scheduling and cross-carrier scheduling scenarios for PUSCH transmissions. In addition, designs for the cross-carrier scheduling scenarios contemplate an FDD scheduling cell or a TDD scheduling cell.

12 Claims, 8 Drawing Sheets

(51) Int. Cl.
| | |
|---|---|
| H04W 76/06 | (2009.01) |
| H04W 24/04 | (2009.01) |
| H04W 40/22 | (2009.01) |
| H04W 52/02 | (2009.01) |
| H04L 12/801 | (2013.01) |
| H04W 72/04 | (2009.01) |
| H04W 48/16 | (2009.01) |
| H04W 40/24 | (2009.01) |
| H04W 88/08 | (2009.01) |
| H04W 36/32 | (2009.01) |
| H04L 29/08 | (2006.01) |
| H04L 1/12 | (2006.01) |
| H04L 12/803 | (2013.01) |
| H04W 84/12 | (2009.01) |
| H04W 92/20 | (2009.01) |

(52) U.S. Cl.
CPC ... H04W 72/0446 (2013.01); H04W 72/0453 (2013.01); H04W 76/068 (2013.01); H04W 88/08 (2013.01); H04W 84/12 (2013.01); H04W 92/20 (2013.01)

(56) References Cited

U.S. PATENT DOCUMENTS

| | | | | |
|---|---|---|---|---|
| 9,301,183 | B2* | 3/2016 | Heo | H04W 52/0258 |
| 2012/0257552 | A1 | 10/2012 | Chen et al. | |
| 2012/0300641 | A1* | 11/2012 | Chen | H04L 1/0026 370/241 |
| 2013/0028149 | A1* | 1/2013 | Chen | H04L 5/0005 370/280 |
| 2013/0114474 | A1* | 5/2013 | Fu | H04L 5/0055 370/280 |
| 2013/0208634 | A1 | 8/2013 | Ji et al. | |
| 2013/0301401 | A1* | 11/2013 | Wang | H04L 5/001 370/209 |
| 2013/0322372 | A1* | 12/2013 | Kim | H04W 16/14 370/329 |
| 2014/0003303 | A1* | 1/2014 | Yang | H04L 1/1867 370/280 |
| 2014/0369242 | A1* | 12/2014 | Ng | H04W 72/0453 370/280 |
| 2015/0003302 | A1 | 1/2015 | Ekpenyong | |
| 2015/0023229 | A1* | 1/2015 | Yin | H04L 5/0032 370/280 |

OTHER PUBLICATIONS

3GPP TS 36.213, "Evolved Universal Terrestrial Radio Access (E-UTRA), Physical Layer Procedures", 3rd Generation Partnership Project, Technical Specification Group Radio Access Network, Technical Specification, Release 11, V11.4.0, Sep. 2013, 182 pages. web page available at: http://www.3gpp.org/DynaReport/36213.htm.

Brydon, Alastair, "Evolution of LTE-Advanced Carrier Aggregation", Mar. 25, 2014, 8 pages. web page available at: http://www.unwiredinsight.com/2014/lte-carrier-aggregation-evolution.

CMCC, "3GPP TR 36.847 Ver. 1.0.0 LTE TDD-FDD joint operation including Carrier Aggregation", 3GPP TSG RAN Meeting #58, RP-131170, Sep. 3-6, 2013, 1 page. web page available at: http://www.3gpp.org/DynaReport/TDocExMtg--RP-61-29572.htm.

Expert Opinion, "HARQ in TD-LTE", "Short LTE articles and opinions by our team of Subject Matter Experts (SMEs), Jul. 6, 2012, 4 pages. web page available at: http://lteuniversity.com/get_trained/expert_opinion1/b/sekhar/archive/2012/07/06/harq-in-td-lte.aspx".

Nokia Corporation, "New WI: LTE TDD-FDD Joint Operation—Core Part", 3GPP TSG RAN meeting #60, RP-130888, Jun. 11-14, 2013, 7 pages. web page available at: http://www.3gpp.org/DynaReport/TDocExMtg--RP-60-29571.htm.

Nokia Corporation, Nokia Siemens, "New WI: LTE TDD-FDD Joint Operation", 3GPP TSG RAN meeting #60, RP-130888, Jun. 11-14, 2013, 6 pages. web page available at: http://www.3gpp.org/DynaReport/TDocExMtg--RP-60-29571.htm.

Nokia Corporation, Nokia Siemens, "New WI: LTE TDD-FDD Joint Operation—Performance Part", 3GPP TSG RAN meeting #60, RP-130888, Jun. 11-14, 2013, 6 pages. web page available at: http://www.3gpp.org/DynaReport/TDocExMtg--RP-60-29571.htm.

Telecomhall, What is Retransmission, ARQ and HARQ?, Jun. 22, 2012, 10 pages. web page available at: http://www.telecomhall.com/what-is-retransmission-arq-and-harq.aspx.

Telesystem Innovations, "LTE in a Nutshell: The Physical Layer", White Paper, Telesystem Innovations Inc., 2010, 18 pages. web page available at: http://www.tsiwireless.com/docs/whitepapers/LTE%20in%20a%20Nutshell%20-%20Physical%20Layer.pdf.

Wannstrom, Jeanette, "The Mobile Broadband Standard", Carrier Aggregation explained, Jun. 2013, 6 pages. web page available at: http://www.3gpp.org/technologies/keywords-acronyms/101-carrier-aggregation-explained.

Samsung, "Solutions for FDD-TDD Joint Operation", R1-133102, 3GPP TSG RAN WG1 Meeting #74,Barcelona, Spain, Aug. 19-23, 2013, pp. 1-2. document available at: http://www.3gpp.org/ftp/tsg_ran/WG1_RL1/TSGR1_74/Docs/R1-133102.zip.

Mediatek Inc., "Deployment Scenarios of FDD-TDD Joint Operation", R1-133288, 3GPP TDG RAN WG1 Meeting #74, Barcelona, Spain, Aug. 19-23, 2013, pp. 1-7 and Figures 1-5. document available at: http://www.3gpp.org/ftp/tsg_ran/WG1_RL1/TSGR1_74/Docs/R1-133288.zip.

CATR, "Scenarios and Requirements for LTE TDD-FDD Joint Operation", R1-133323, 3GPP RAN WG1 Meeting #74, Barcelona, Spain, Aug. 19-23, 2013, pp. 1-3. document available at: http://www.3gpp.org/ftp/tsg_ran/WG1_RL1/TSGR1_74/Docs/R1-133323.zip.

ETRI, "Discussion on FDD-TDD Joint Operation Solutions", R1-133184, 3GPP TSG RAN WG1 Meeting #74, Barcelona, Spain, Aug. 19-23, 2013, pp. 1-7, and Figures 1-4. document available at: http://www.3gpp/ftp/tsg_ran/WG1_RL1/TSGR1_74/Docs/R1-133184.zip.

PCT/US2014/051218, International Search Report and Written Opinion, mailed Dec. 29, 2014, 10 pages.

\* cited by examiner

HARQ TIMELINES FOR TDD-FDD CARRIER AGGREGATION

RELATED APPLICATION

The present disclosure claims priority benefit of U.S. Provisional Patent Application No. 61/883,127, filed Sep. 26, 2013, which is hereby incorporated by reference herein in its entirety.

TECHNICAL FIELD

Embodiments of the present disclosure generally relate to wireless communications and, more particularly, to wireless network configurations for evolved universal terrestrial radio access (EUTRA) networks (EUTRANs) operating in accordance with third-generation partnership project (3GPP) standards for long term evolution (LTE) networks.

BACKGROUND INFORMATION

Previous LTE release programs (i.e., Rel-10 and Rel-11) have provided for a user equipment device, also referred to as simply a user equipment (UE), to simultaneously access multiple component carriers employing the same duplex mode. The available duplex modes are either time division duplex (TDD) or frequency division duplex (FDD) modes. For example, wireless network configurations employing TDD-TDD (or FDD-FDD) carrier aggregation (CA) allow a UE to access a primary cell (PCell) component carrier (CC) that provides non-access stratum mobility information and one or more secondary cell(s) (SCell) CC(s) providing additional data transmission bandwidth for the UE. In this example, the SCell would include the same duplex mode as that of the PCell.

DETAILED DESCRIPTION OF EMBODIMENTS

Aspects and advantages of the present disclosure will be apparent from the following detailed description of embodiments, which proceeds with reference to the aforementioned drawings.

1. Carrier Aggregation

Figure 1:
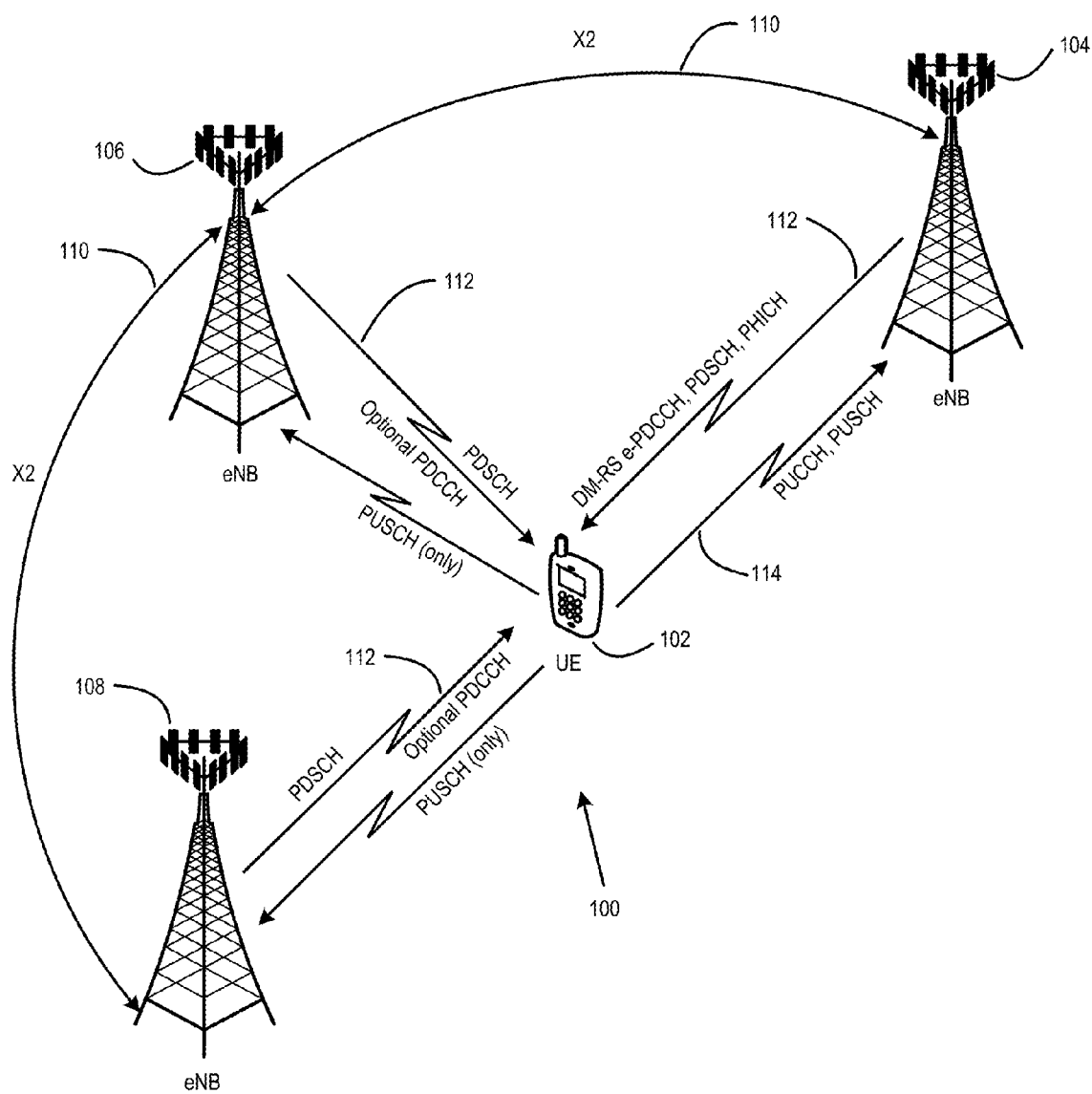
FIG. 1 is a block diagram of a wireless network configuration in accordance with some embodiments.

FIG. 1 illustrates a wireless network in accordance with some embodiments. A wireless network 100 includes a UE 102 and a plurality of eNBs 104, 106, and 108 providing communication services to UEs, such as UE 102. In some embodiments, eNBs 104, 106, and 108 may communicate with one another over an X2 (backhaul) interface 110. Each eNB 104, 106, and 108 may be associated with a set of one or more serving cells that may include macrocells and small cells.

In some embodiments, eNB 104 and eNB 106 (or other eNBs) may engage in inter-eNB CA. In inter-eNB CA, serving cells (PCells and SCells) are operated among different eNBs. For example, the PCell is served from a macrocell of eNB 104, an SCell is served from a small cell of eNB 106, and those serving cells communicate through the X2 interface 110. With inter-eNB CA, two or more component carriers of different cells collectively serve UE 102 that receives resource blocks of a downlink channel 112 available from two or more eNBs (e.g., eNB 104, 106, or 108). Inter-eNB CA is an example of dual connectivity operation, in which a given UE consumes radio resources provided by at least two different network points (Master and Secondary eNBs) connected with non-ideal backhaul while in a radio resource control (RRC) state of "RRC_CONNECTED."

Typically, a PCell is configured with one physical downlink control channel (PDCCH), one physical uplink control channel (PUCCH), and a physical HARQ indicator channel (PHICH). It could also have a PDSCH or a PUSCH. An SCell could be configured with those shared channels, a PDCCH and PHICH, but usually not with a PUCCH in conventional LTE systems. For example, the downlink channel 112 of eNB 104 includes a PDSCH, PDCCH and a PHICH. In some embodiments, an uplink channel 114 may include a PUSCH or PUCCH.

2. Joint Operation

LTE release program 12 (Rel-12) is intended to support joint operation. In joint operation systems, a UE simultaneously accesses TDD and FDD carriers. This allows LTE operators possessing available spectrum for both LTE FDD and TDD modes to provide both of the TDD and FDD spectrum resources simultaneously to a UE, thereby improving system performance and user experience. Joint operation is typically referred to as "TDD-FDD" joint operation, but is also referred to as "FDD+TDD," or other shorthand terms. The order of "TDD" and "FDD" in "TDD-FDD" is simply a common convention that does not impart any limitation.

To develop support for TDD-FDD joint operation in Rel-12, some 3GPP members have developed a TDD-FDD joint operation work item. The work item objective is to enhance joint operation of the LTE TDD and FDD modes by defining wireless network configurations employing CA among these modes (TDD-FDD CA), as well as other potential deployment scenarios for TDD-FDD joint operation including flexible aggregation options, e.g., allowing either TDD or FDD CCs to act as the primary carrier in the aggregated connection and to carry the associated control signaling. The TDD-FDD joint operation work item includes an initial evaluation phase for identifying technical requirements and potential solutions for joint operation, and defining a generic framework for CA for the two modes.

The technical specifications group (TSG) radio access network (RAN) (TSG RAN) is responsible for the definition of the functions, requirements and interfaces of the UTRAN/ EUTRAN in its duplex modes: currently FDD and TDD. Among the TSG RAN, the RAN working group 1 (or simply, RAN1) is responsible for the radio layer 1 specification of the physical layer of the radio interface for UE, UTRAN, EUTRAN, and beyond; covering both FDD and TDD modes of the radio interface. At the RAN1 #74 meeting, some agreements related to TDD-FDD joint operation were reached and summarized as follows.

First, the LTE TDD-FDD CA solution, according to the RAN plenary (RP)-130888 agreement, is identified as the TDD-FDD joint operation solution where ideal backhaul is assumed. Second, if it is decided to specify dual connectivity as a result of the RAN2 small cell enhancement study item, and it is decided to support a solution that is not based on CA for TDD-FDD joint operation, then in some embodiments the dual connectivity feature would be designed to support TDD-FDD dual connectivity in the applicable scenarios, in addition to TDD-TDD and FDD-FDD dual connectivity.

TDD-FDD CA in Rel-12 may target UEs with or without the capability of multiple uplink transmission in one subframe. It may also target different deployment scenarios including both co-located scenarios (e.g., CA scenarios 1-3 of Rel-10/11), as depicted in FIG. 2, and a non-co-located scenario (e.g., CA scenario 4 of Rel-10/11), as depicted in FIG. 3.

Figure 2:
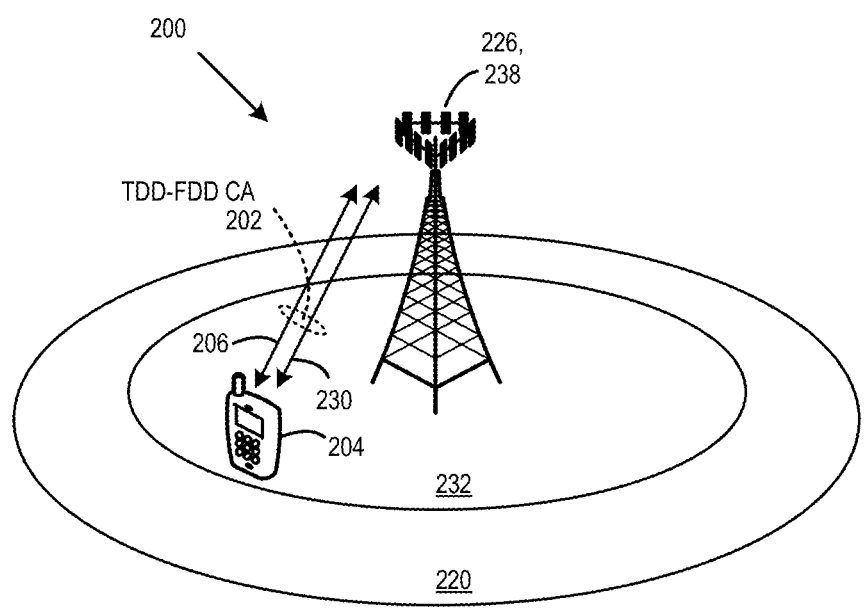
FIG. 2 is a block diagram of a wireless network configuration employing co-located evolved universal terrestrial radio access network node Bs (eNBs) using TDD-FDD joint operation CA in accordance with some embodiments.

FIG. 2 shows a co-located (ideal backhaul scenario) embodiment of a wireless network configuration 200 employing TDD-FDD joint operation CA 202. A UE 204 aggregates an FDD CC 206 of a first serving cell 220 provided by a first eNB 226, together with a TDD CC 230 of a second serving cell 232 provided by a second (co-located) eNB 238.

Figure 3:
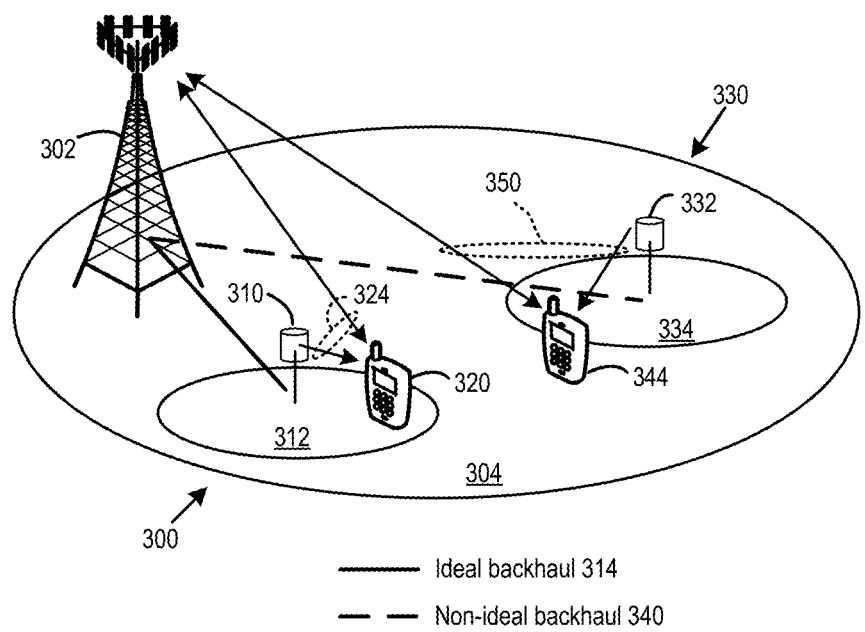
FIG. 3 is a block diagram of a wireless network configuration employing non-co-located eNBs using TDD-FDD joint operation CA in accordance with some embodiments.

FIG. 3 shows two non-co-located embodiments employing TDD-FDD joint operation solutions for respective ideal and non-ideal backhaul scenarios. A first wireless network configuration 300 includes an eNB 302 providing a macrocell 304 of a first duplex mode (FDD or TDD) CC, and a remote radio head (RRH) 310 providing a small cell 312 of the opposite duplex mode (TDD or FDD) to that of the macrocell 304. ENB 302 and RRH 310 are connected with an ideal backhaul 314, and provide a UE 320 with a TDD-FDD joint operation CA solution 324. A second wireless network configuration 330 also includes eNB 302 for macrocell 304, but in this embodiment a pico eNB 332 provides a small cell 334 of the opposite duplex mode (TDD or FDD) to that of the macrocell 304. ENB 302 and pico eNB 332 are connected with a non-ideal backhaul 340, and provide a UE 344 with a TDD-FDD dual connectivity solution 350.

In general, an assumption of ideal backhaul would result in improved operational efficiencies and enable the reuse of Rel-10/11 CA design principles. For example, Rel-10/11 principles may be used for decoding a PHICH, detecting an associated HARQ, and so forth. This disclosure supplements those principles with technical features and solutions accommodating the differences between TDD-FDD CA and the predecessor single-duplex mode Rel-10/11 TDD-TDD CA (or FDD-FDD CA).

Set forth in the present description are several embodiments of designs for HARQ feedback timing following PDSCH and PUSCH transmissions (or simply, PDSCH and PUSCH). These embodiments include both HARQ feedback from a UE and HARQ feedback from an eNB. The HARQ feedback timeline of a UE (the PDSCH HARQ timeline) is for HARQ bits messages transmitted by the UE in response to downlink (re)transmission, whereas the HARQ feedback timeline of an eNB (the PUSCH HARQ timeline) is for HARQ bits messages from the eNB in response to uplink (re)transmissions. Moreover, the PUSCH HARQ timeline embodiments include both self-scheduling and cross-carrier scheduling scenarios. In addition, the designs for the PUSCH HARQ timeline include scenarios for an FDD acting as a scheduling serving cell or a TDD acting as a scheduling serving cell. Thus, the present description encompasses an end-to-end UE and eNB HARQ protocol design for various TDD-FDD joint operation wireless network configurations.

3. PDSCH HARQ Timeline

In Rel-10/11 CA, PUCCH is transmitted on a PCell and not on an SCell. Accordingly, assuming PUCCH is transmitted on one serving cell, then for the case where an FDD CC is configured as a PCell and a TDD CC is configured as an SCell, the PDSCH transmitted on the TDD CC follows a predefined FDD HARQ timeline for the FDD CC.

Figure 4:
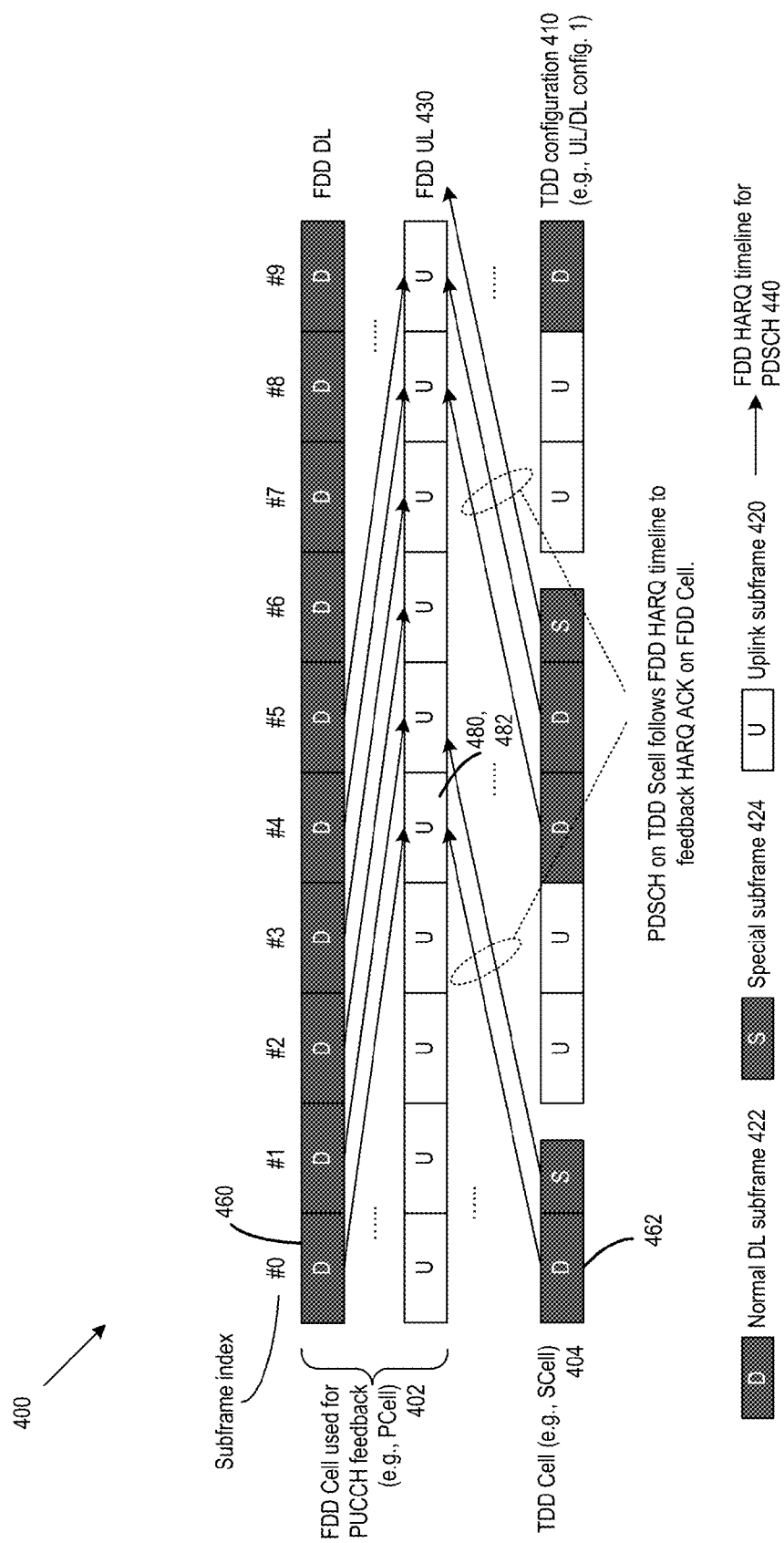
FIG. 4 is a timeline of subframes showing a physical downlink shared channel (PDSCH) hybrid automatic repeat request (HARQ) timeline in accordance with some embodiments.

For example, FIG. 4 shows a PDSCH HARQ timeline 400, according to one embodiment. In this example, there is an FDD CC cell 402 and a TDD CC cell 404. Cell 402 is the one used for PUCCH feedback (e.g., it is the PCell), whereas cell 404 is the SCell. A predefined TDD configuration 410 (i.e., the TDD uplink (UL)/downlink (DL) configuration that determines the sequence of UL 420, DL 422, and special 424 subframes of a TDD CC) is of configuration type 1 in this example, though other configuration types are certainly possible.

Previously, with TDD-TDD CA systems, in response to a PDSCH during a first subframe, a UE would transmit to the SCell eNB a HARQ-acknowledgement (ACK) or HARQ-negative ACK (NACK) in a subsequent subframe index value specified according to a TDD HARQ timeline (specified in section 10.1.3.1 of 3GPP TS 36.213). Such a TDD HARQ timeline, however, cannot provide for an uplink subframe for each transmission time interval in a given TDD UL/DL configuration type—TDD systems, perforce, use at least some subframes for downlink purposes. Therefore, a UE following such a TDD HARQ timeline would be forced to wait until an uplink subframe is available before the UE could transmit the aforementioned HARQ-ACK or HARQ-NACK.

In joint operation, however, there is always an available subframe on the FDD CC UL 430 because the FDD UL and DL are separate resources that overlap in time. Therefore, a UE employing timeline 400 simply provides its HARQ-ACK or HARQ-NACK according to the FDD HARQ timing. An example FDD HARQ timing is specified in section 10.1.2.1 of 3GPP TS 36.213, which is shown by arrows 440 indicating that a PDSCH on TDD Scell 404 follows FDD HARQ timeline to feedback a HARQ-ACK on FDD Cell 402. This technique more evenly distributes HARQ payloads across uplink subframes. It also results in a decreased round-trip time (RTT) latency because the RTT latency is based on that of an FDD system (i.e., 4 ms, which is the duration of four subframes) compared to that of a TDD system (which depends on a subframe index value and the TDD UL/DL configuration type, as specified in section 10.1.3.1 of 3GPP TS 36.213).

According to timeline 400, showing TDD UL/DL configuration type 1, during subframe #0 a UE (not shown) is receiving 460 a first PDSCH transmission on the FDD CC provided by a first eNB, and receiving 462 a second PDSCH transmission on the TDD CC provided by a second eNB, which may be co-located (200, FIG. 2) or non-co-located (300, FIG. 3). The UE is thereafter generating a first HARQ bits message in response to receiving the first PDSCH, and generating a second HARQ bits message for the second eNB in response to receiving the second PDSCH. During subframe #4, the UE is transmitting 480 the first HARQ bits message in an uplink subframe of the FDD CC according to a predefined HARQ timing for an FDD LTE system, and transmitting 482 the second HARQ bits message in the same uplink subframe on the FDD CC according to the predefined HARQ timing. As noted previously, the predefined HARQ timing is specified in 3GPP TS 36.213, in which a PDSCH during a subframe index value of n results in the UE transmitting an associated HARQ message during a subframe index value of n+4.

4. PUSCH HARQ Timeline

There are presently two types of scheduling techniques for uplink transmission in CA systems. The first type is called self-scheduling, in which each CC includes its own PDCCH and PHICH resources that schedule PUSCH transmission on that CC. The second type is called cross-carrier scheduling, in which a scheduling serving cell (or simply, scheduling cell) includes a PDCCH and PHICH that schedules uplink transmission for both the scheduling cell and its (cross-)scheduled cell. PUSCH HARQ timelines for each of these two cases are as follows.

In the case of self-scheduling, a PHICH is transmitted on a corresponding DL CC that was used to transmit the UL grant for the CC, and each serving cell follows its own HARQ timing for PUSCH HARQ feedback. In other words, if a UL grant is on the FDD CC, then FDD PUSCH HARQ timing (specified in section 8.3 of TS 36.213) will be followed and a HARQ message will be provided by a PHICH on the FDD DL. And if a UL grant is on the TDD CC, then TDD PUSCH HARQ timing (also specified in section 8.3 of TS 36.213) will be followed and a HARQ message will be provided by a PHICH on the TDD DL.

In the case of cross-carrier scheduling, there are several possible designs for a PUSCH HARQ timeline design. These designs depend on whether the scheduling cell is in FDD or TDD mode, and whether the scheduled cell follows FDD or TDD PUSCH scheduling and HARQ timing. An overview of these designs is provided in the following table.

Table of PUSCH scheduling and HARQ timing designs for TDD-FDD joint operation, cross-carrier scheduling carrier aggregation

Figure 5:
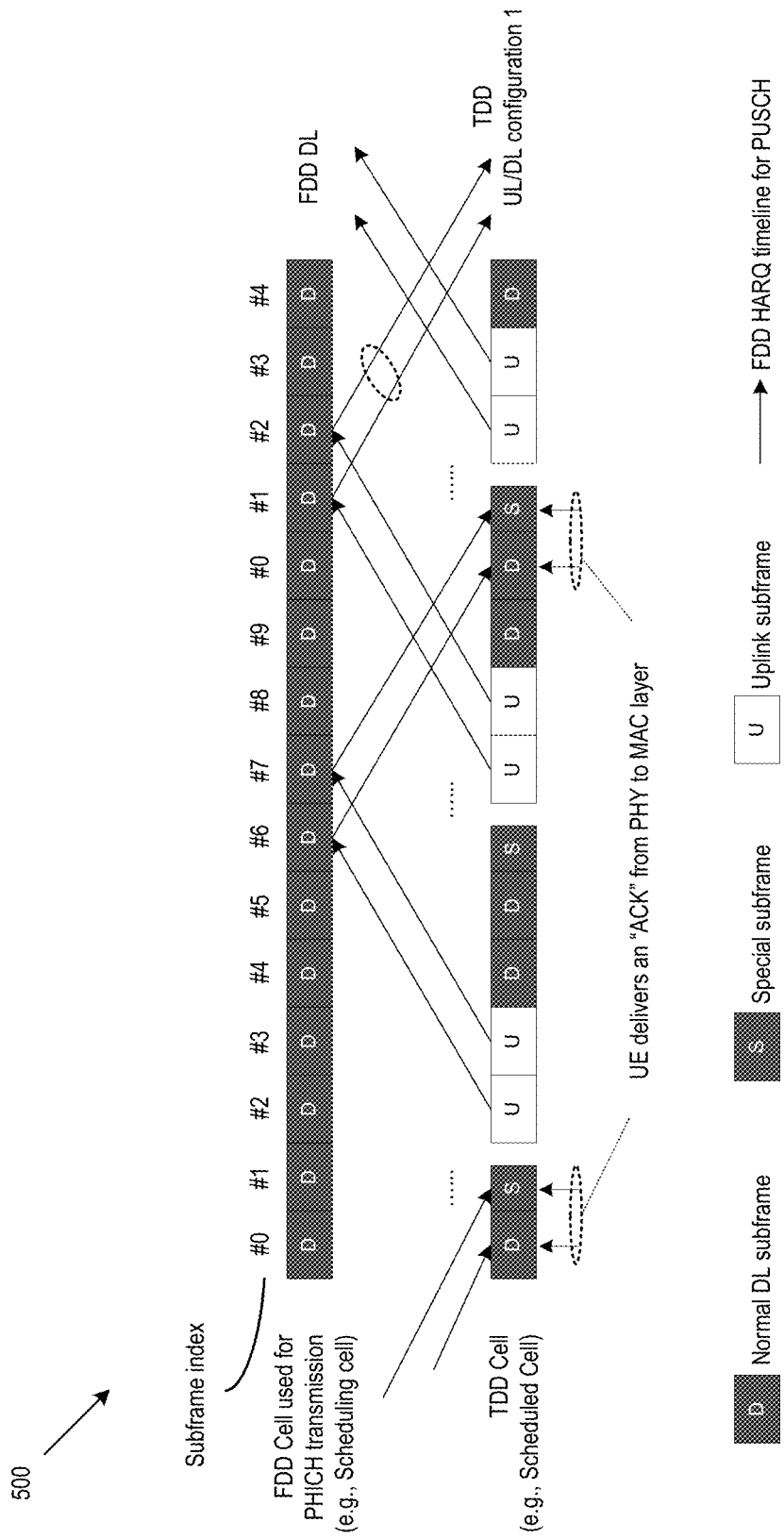
FIG. 5 is a timeline of subframes showing a physical uplink shared channel (PUSCH) HARQ timeline in accordance with a first embodiment.
Figure 6:
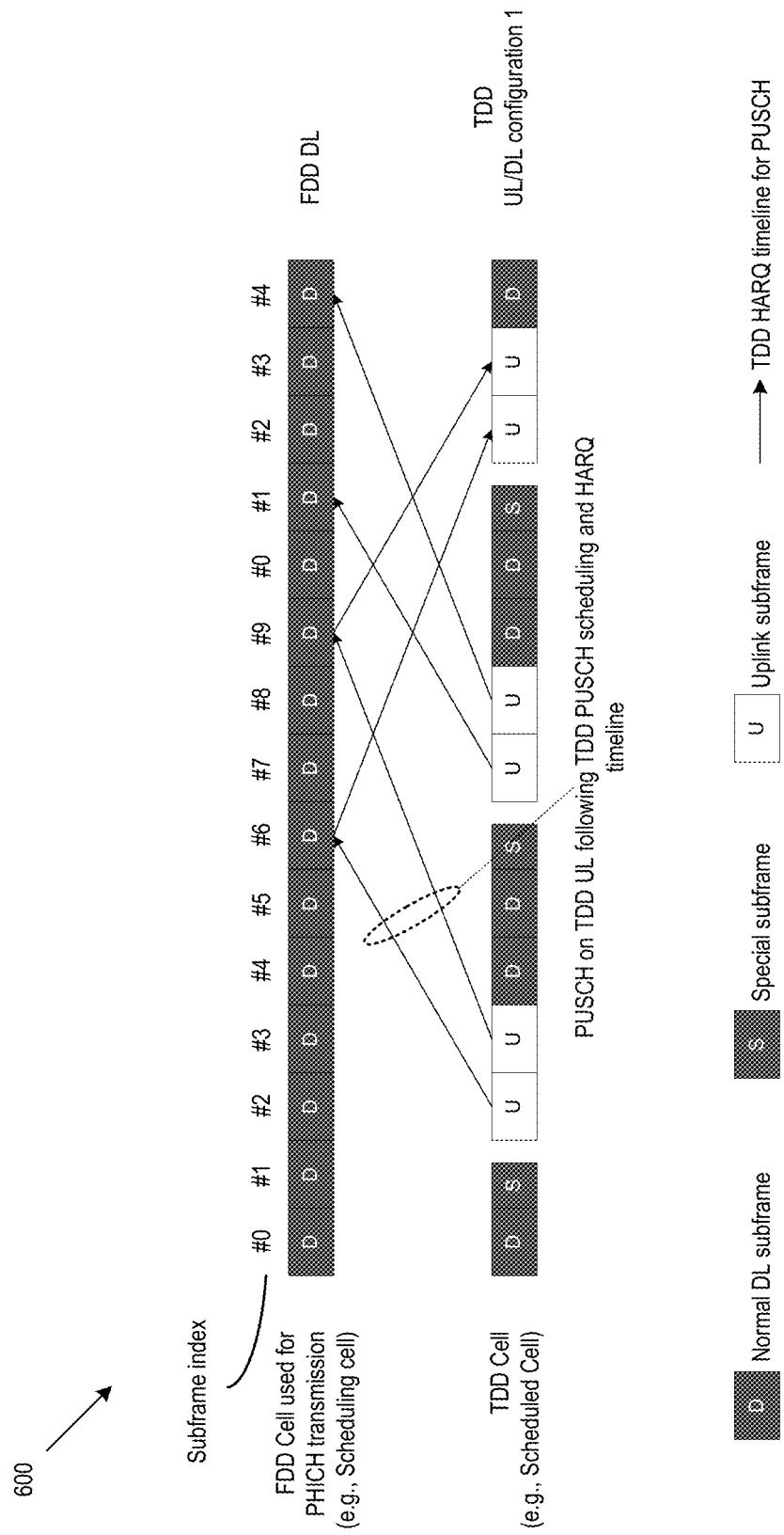
FIG. 6 is a timeline of subframes showing a PUSCH HARQ timeline in accordance with a second embodiment.
Figure 7:
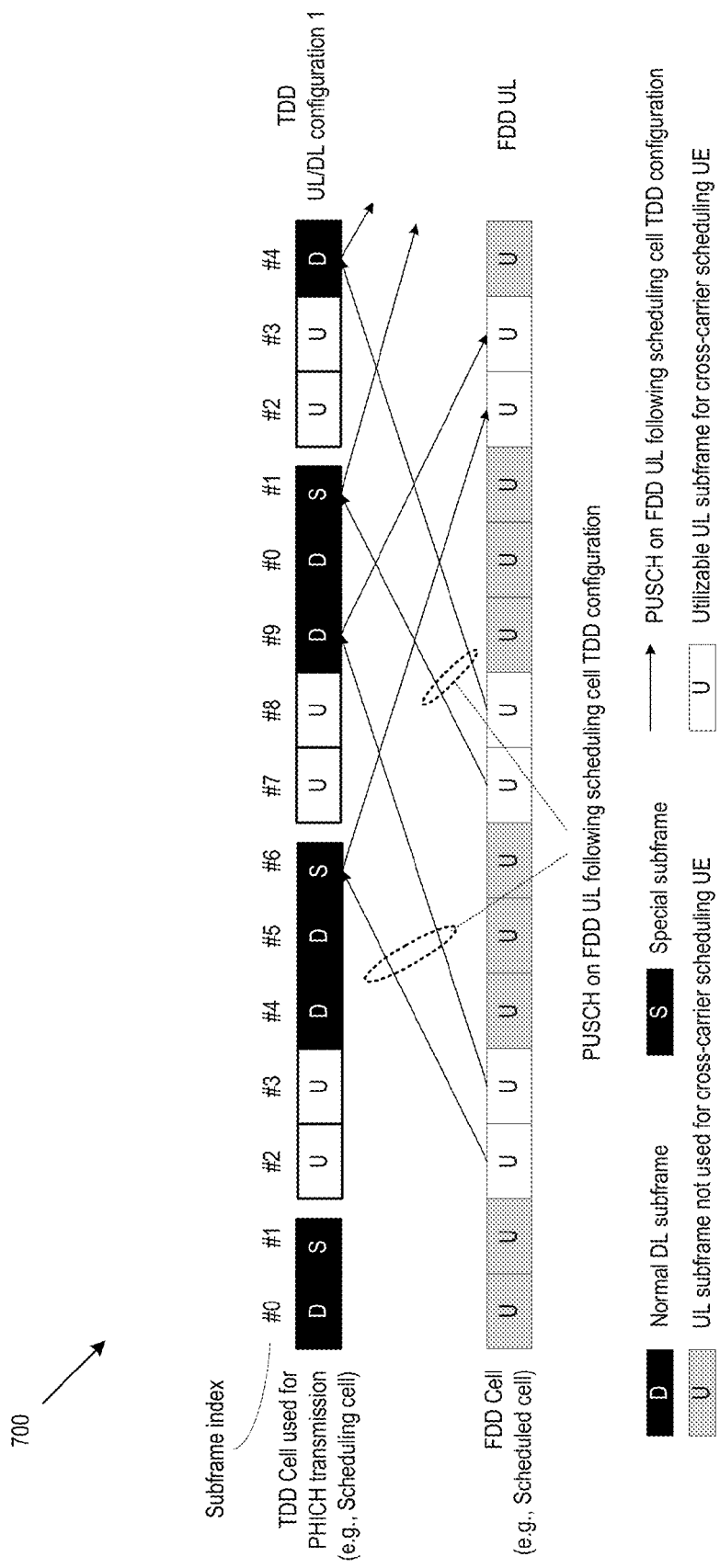
FIG. 7 is a timeline of subframes showing a PUSCH HARQ timeline in accordance with a third embodiment.

|  | FDD CC Scheduling Cell TDD CC Scheduled Cell (case 1) | TDD CC Scheduling Cell FDD CC Scheduled Cell (case 2) |
| --- | --- | --- |
| Follow FDD CC's PUSCH scheduling/ HARQ timeline | example timeline shown in FIG. 5 (option 1) | FIG. 7 subframe #7 has a TDD UL subframe that is N/A for PHICH/PDCCH (no case 2 option) |
| Follow TDD CC's PUSCH scheduling/ HARQ timeline | example timeline shown in FIG. 6 (option 2) | example timeline shown in FIG. 7 (case 2 option) |

According to case 1, an FDD CC is configured as a scheduling cell and a TDD CC is thereby cross-scheduled by the FDD CC. As shown in FIGS. 5 and 6, there is an FDD DL subframe during each transmission time interval on FDD CC of the scheduling cell. Therefore, Rel-10 cross-carrier scheduling of a PUSCH can be directly applied to the cross-scheduled TDD CC. The cross-scheduled TDD CC may, therefore, optionally employ either FDD or TDD scheduling/HARQ timelines for PUSCH on the TDD CC, as explained in the following two paragraphs.

FIG. 5 shows that option 1 is to follow the FDD CC's PUSCH scheduling/HARQ timeline 500. This approach aims at reducing retransmission latency of PUSCH on the TDD CC. UL retransmission timing is premised upon a synchronous protocol, so a retransmission occurs at a predefined time after the initial transmission. But when the TDD CC follows the FDD CC predefined timing in option 1, PUSCH retransmission may be blocked when the predefined subframe for synchronous retransmission is a TDD DL subframe on a TDD SCell. For example, assuming during subframe #3 of FIG. 5 a UE transmits a PUSCH on the TDD CC, and during subframe #7 a PHICH or PDCCH provides a HARQ-NACK to the UE for that transmitted PUSCH, then the UE could not simply follow the synchronous protocol and retransmit the PUSCH on the following subframe #1 because that subframe is a TDD DL subframe—there is no TDD UL available during this transmission time. When this occurs, the UE recognizes there is a "blocked" subframe, the UE delivers an ACK from a physical (PHY) layer to a media access control (MAC) layer in that subframe, and retransmission scheduling is handled by higher-layer (e.g., RRC) signaling.

FIG. 6 shows that option 2 is to follow the TDD CC's PUSCH scheduling/HARQ timeline 600, which would provide that UL subframes on the TDD CC are always available for PUSCH retransmission on the TDD SCell. This avoids the aforementioned "blocked" retransmission, but this approach also leads to a larger PUSCH RTT latency (of a TDD system) compared to that of option 1.

According to case 2, a TDD CC is configured as a scheduling serving cell and an FDD CC is cross-scheduled according to the TDD CC. FIG. 7 shows that, in this case, the FDD scheduled cell follows the TDD CC's PUSCH scheduling/HARQ timeline 700. Accordingly, to maximize the UL peak data rate performance, the overlapping UL subframes between scheduling and scheduled cells are cross-scheduled, and the FDD cell follows scheduling/HARQ timing of the TDD scheduling cell. As in previous examples, timeline 700 assumes the TDD UL/DL configuration is configuration type 1, but this is simply for illustrative purposes and other configuration types are possible.

FIG. 7 also demonstrates why the FDD scheduled cell would not follow FDD timing. For example, assuming the FDD cell attempts to follow FDD timing, the FDD cell would transmit PUSCH during subframe #3, and then expect to detect a corresponding HARQ in the PHICH during subframe #7. As noted in the table, however, subframe #7 is a UL subframe of the TDD cell and therefore not available for a PHICH or PDCCH.

5. Example UE

Figure 8:
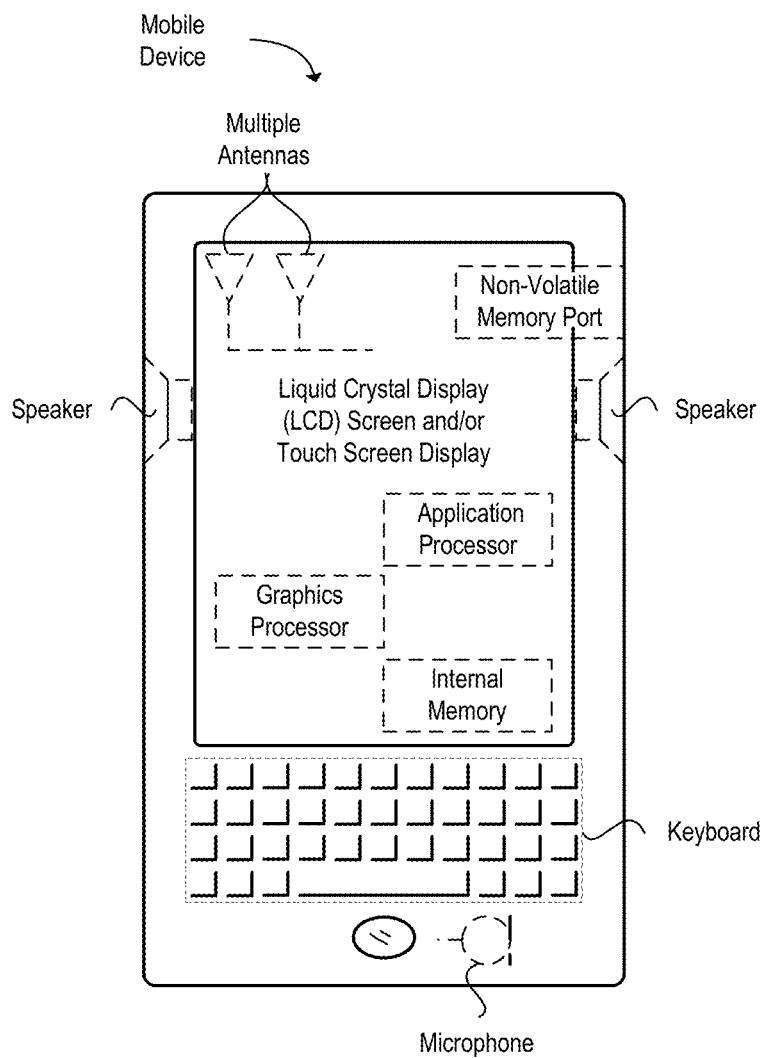
FIG. 8 is a block diagram of a wireless communication device UE in accordance with some embodiments.

FIG. 8 provides an example illustration of a mobile device, such as a UE, a mobile station, a mobile wireless device, a mobile communication device, a tablet, a handset, or other type of mobile wireless device. The mobile device can include one or more antennas configured to communicate with a transmission station, such as a base station, an eNB, a base band unit, a RRH, a remote radio equipment, a relay statioN, a radio equipment, or other type of wireless wide area network (WWAN) access point. The mobile device can be configured to communicate using at least one wireless communication standard including 3GPP LTE, WiMAX, high speed packet access, Bluetooth, and WiFi. The mobile device can communicate using separate antennas for each wireless communication standard or shared antennas for multiple wireless communication standards. The mobile device can communicate in a wireless local area network, a wireless personal area network, and/or a WWAN.

FIG. 8 also provides an illustration of a microphone and one or more speakers that can be used for audio input to and output from the mobile device. The display screen may be a liquid crystal display screen, or other type of display screen such as an organic light emitting diode display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

6. Example Embodiments

In one embodiment, a user equipment (UE) for time division duplex (TDD) and frequency division duplex (FDD) joint operation comprises:
  a receiver configured to receive a first physical downlink shared channel (PDSCH) transmission on an FDD component carrier (CC) provided by a first evolved universal terrestrial radio access network node B (eNB), and to receive a second PDSCH transmission on a TDD CC provided by a second eNB;
  circuitry configured to:
  generate a first hybrid automatic repeat request (HARQ) bits message for the first eNB in response to receiving the first PDSCH; and
  generate a second HARQ bits message for the second eNB in response to receiving the second PDSCH; and
  a transmitter configured to transmit the first HARQ bits message in a first uplink subframe of the FDD CC according to a predefined HARQ timing for an FDD long term evolution (LTE) system, and to transmit the second HARQ bits message in a second uplink subframe on the FDD CC according to the predefined HARQ timing.

The UE embodiment in which the predefined HARQ timing specifies that, for a PDSCH transmission received in a downlink subframe having a subframe index value of n, a corresponding HARQ bits message is to be transmitted during an uplink subframe having a subframe index value of n+4.

The UE embodiment, in which the first and second eNBs are the same eNB.

The UE embodiment, in which the first eNB and the second eNB are different eNBs connected by a backhaul interface.

The UE embodiment of any of the four preceding paragraphs, in which the first and second uplink subframes are the same subframe, and the transmitter is configured to transmit in the same subframe a concatenation of the first and second HARQ bits messages for the first and second eNBs.

The UE embodiment, in which the first HARQ bits message comprises a HARQ acknowledgement (HARQ-ACK) bit.

The UE embodiment, in which the first eNB receives the first and second HARQ bits messages in a physical uplink control channel (PUCCH) or physical uplink shared channel (PUSCH).

In another embodiment, a method for time division duplex (TDD) and frequency division duplex (FDD) joint operation comprises:
  receiving a first physical downlink shared channel (PDSCH) transmission on an FDD component carrier (CC) provided by a first evolved universal terrestrial radio access network node B (eNB);
  receiving a second PDSCH transmission on a TDD CC provided by a second eNB;
  generating a first hybrid automatic repeat request (HARQ) bits message for the first eNB in response to receiving the first PDSCH;
  generating a second HARQ bits message for the second eNB in response to receiving the second PDSCH;
  transmitting the first HARQ bits message in a first uplink subframe of the FDD CC according to a predefined HARQ timing for an FDD long term evolution (LTE) system; and
  transmitting the second HARQ bits message in a second uplink subframe on the FDD CC according to the predefined HARQ timing.

The method embodiment, in which the predefined HARQ timing specifies that, for a PDSCH transmission received in a downlink subframe having a subframe index value of n, a corresponding HARQ bits message is to be transmitted during an uplink subframe having a subframe index value of n+4.

The method embodiment, in which the first and second eNBs are the same eNB.

The method embodiment, in which the first eNB and the second eNB are different eNBs connected by a backhaul interface.

The method embodiment of any of the four preceding paragraphs, in which the first and second uplink subframes are the same subframe, and a concatenation of the first and second HARQ bits messages for the first and second eNBs are transmitted simultaneously during the same subframe.

The method embodiment, in which the first HARQ bits message comprises a HARQ acknowledgement (HARQ-ACK) bit.

The method embodiment, in which the first eNB receives the first and second HARQ bits messages in a physical uplink control channel (PUCCH) or physical uplink shared channel (PUSCH).

In yet another embodiment, a computer-readable medium configured to facilitate time division duplex (TDD) and frequency division duplex (FDD) joint operation, has stored thereon computer-executable instructions executable by a user equipment (UE) to cause the UE to:
  receive a first physical downlink shared channel (PDSCH) transmission on an FDD component carrier (CC) provided by a first evolved universal terrestrial radio access network node B (eNB);
  receive a second PDSCH transmission on a TDD CC provided by a second eNB;
  generate a first hybrid automatic repeat request (HARQ) bits message for the first eNB in response to receiving the first PDSCH;
  generate a second HARQ bits message for the second eNB in response to receiving the second PDSCH;
  transmit the first HARQ bits message in a first uplink subframe of the FDD CC according to a predefined HARQ timing for an FDD long term evolution (LTE) system; and transmit the second HARQ bits message in a second uplink subframe on the FDD CC according to the predefined HARQ timing.

The computer-readable medium embodiment, in which the predefined HARQ timing specifies that, for a PDSCH transmission received in a downlink subframe having a subframe index value of n, a corresponding HARQ bits message is to be transmitted during an uplink subframe having a subframe index value of n+4.

The computer-readable medium embodiment, in which the first and second eNBs are the same eNB.

The computer-readable medium embodiment, in which the first eNB and the second eNB are different eNBs connected by a backhaul interface.

The computer-readable medium embodiment of any of the four preceding paragraphs, in which the first and second uplink subframes are the same subframe, and a concatenation of the first and second HARQ bits messages for the first and second eNBs are transmitted simultaneously during the same subframe.

The computer-readable medium embodiment, in which the first HARQ bits message comprises a HARQ acknowledgement (HARQ-ACK) bit.

The computer-readable medium embodiment, in which the first eNB receives the first and second HARQ bits messages in a physical uplink control channel (PUCCH) or physical uplink shared channel (PUSCH).

In still another embodiment, a user equipment (UE) for wireless communication according to a time division duplex (TDD) and frequency division duplex (FDD) TDD-FDD carrier aggregation (CA) (TDD-FDD CA) configuration comprises:

a transmitter to transmit a first physical uplink shared channel (PUSCH) on an FDD CC component carrier (CC) of the TDD-FDD CA configuration during a first subframe corresponding to a first predefined PUSCH scheduling timing, and transmit a second PUSCH on a TDD CC of the TDD-FDD CA configuration during a second subframe corresponding to a second predefined PUSCH scheduling timing, in which the first predefined PUSCH scheduling timing is different from the second predefined PUSCH scheduling timing; and circuitry to configure the UE to detect on the FDD CC, according to a first predefined PUSCH hybrid automatic repeat request (HARQ) timing, a first physical HARQ indicator channel (PHICH) associated with the first PUSCH, and detect on the TDD CC, according to a second predefined PUSCH HARQ timing, a second PHICH associated with the second PUSCH, in which the first predefined PUSCH HARQ timing is different from the second predefined PUSCH HARQ timing.

The UE embodiment, further comprising a receiver configured to receive on the FDD CC and TDD CC, simultaneously, the first PHICH associated with the first PUSCH and the second PHICH associated with the second PUSCH.

The UE embodiment, in which the first predefined PUSCH scheduling timing specifies that, in response to the UE receiving an FDD CC uplink grant during a downlink subframe having a subframe index value of n, the transmitter is configured to transmit the first PUSCH in an FDD uplink subframe having a subframe index value of n+4.

The UE embodiment, in which the second predefined PUSCH scheduling timing specifies that, in response to the UE receiving a TDD CC uplink grant during a downlink subframe having a subframe index value of n, the transmitter is configured to transmit the second PUSCH in a TDD uplink subframe having a subframe index value of n+k, where $k \geq 4$ and where k is based on a preconfigured TDD configuration type of the TDD CC.

The UE embodiment, in which the first predefined PUSCH HARQ timing specifies that a PUSCH on the FDD CC during a subframe index value of n has an associated HARQ message on the first PHICH during a subframe index value of n+4.

The UE embodiment, in which the second predefined PUSCH HARQ timing specifies that a PUSCH on the TDD CC during a subframe index value of n has an associated HARQ message on the second PHICH during a subframe index value of n+k, where $k \geq 4$ and where k is based on a preconfigured TDD configuration of the TDD CC.

The UE embodiment, in which the FDD and TDD CCs are provided by co-located evolved universal terrestrial radio access network node Bs.

In another embodiment, a method for wireless communication according to a time division duplex (TDD) and frequency division duplex (FDD) TDD-FDD carrier aggregation (CA) (TDD-FDD CA) configuration comprises:

transmitting a first physical uplink shared channel (PUSCH) on an FDD CC component carrier (CC) of the TDD-FDD CA configuration during a first subframe corresponding to a first predefined PUSCH scheduling timing;

transmitting a second PUSCH on a TDD CC of the TDD-FDD CA configuration during a second subframe corresponding to a second predefined PUSCH scheduling timing, in which the first predefined PUSCH scheduling timing is different from the second predefined PUSCH scheduling timing;

detecting on the FDD CC, according to a first predefined PUSCH hybrid automatic repeat request (HARQ) timing, a first physical HARQ indicator channel (PHICH) associated with the first PUSCH; and detecting on the TDD CC, according to a second predefined PUSCH HARQ timing, a second PHICH associated with the second PUSCH, in which the first predefined PUSCH HARQ timing is different from the second predefined PUSCH HARQ timing.

The method embodiment, further comprising receiving on the FDD CC and TDD CC, simultaneously, the first PHICH associated with the first PUSCH and the second PHICH associated with the second PUSCH.

The method embodiment, in which the first predefined PUSCH scheduling timing specifies that, in response to the UE receiving an FDD CC uplink grant during a downlink subframe having a subframe index value of n, the transmitting of the first PUSCH occurs in an FDD uplink subframe having a subframe index value of n+4.

The method embodiment, in which the second predefined PUSCH scheduling timing specifies that, in response to the UE receiving a TDD CC uplink grant during a downlink subframe having a subframe index value of n, the transmitting of the second PUSCH occurs in a TDD uplink subframe having a subframe index value of n+k, where $k \geq 4$ and where k is based on a preconfigured TDD configuration type of the TDD CC.

The method embodiment, in which the first predefined PUSCH HARQ timing specifies that a PUSCH on the FDD CC during a subframe index value of n has an associated HARQ message on the first PHICH during a subframe index value of n+4.

The method embodiment, in which the second predefined PUSCH HARQ timing specifies that a PUSCH on the TDD CC during a subframe index value of n has an associated HARQ message on the second PHICH during a subframe index value of n+k, where k≥4 and where k is based on a preconfigured TDD configuration of the TDD CC.

The method embodiment, in which the FDD and TDD CCs are provided by co-located evolved universal terrestrial radio access network node Bs.

According to anther embodiment, a computer-readable medium for wireless communication according to a time division duplex (TDD) and frequency division duplex (FDD) TDD-FDD carrier aggregation (CA) (TDD-FDD CA) configuration, has stored thereon, computer-executable instructions executable by a user equipment (UE) to cause the UE to:

transmit a first physical uplink shared channel (PUSCH) on an FDD CC component carrier (CC) of the TDD-FDD CA configuration during a first subframe corresponding to a first predefined PUSCH scheduling timing;

transmit a second PUSCH on a TDD CC of the TDD-FDD CA configuration during a second subframe corresponding to a second predefined PUSCH scheduling timing, in which the first predefined PUSCH scheduling timing is different from the second predefined PUSCH scheduling timing;

detect on the FDD CC, according to a first predefined PUSCH hybrid automatic repeat request (HARQ) timing, a first physical HARQ indicator channel (PHICH) associated with the first PUSCH; and detect on the TDD CC, according to a second predefined PUSCH HARQ timing, a second PHICH associated with the second PUSCH, in which the first predefined PUSCH HARQ timing is different from the second predefined PUSCH HARQ timing.

The computer-readable medium embodiment, further comprising instructions executable by a user equipment (UE) to cause the UE to receive on the FDD CC and TDD CC, simultaneously, the first PHICH associated with the first PUSCH and the second PHICH associated with the second PUSCH.

The computer-readable medium embodiment, in which the first predefined PUSCH scheduling timing specifies that, in response to the UE receiving an FDD CC uplink grant during a downlink subframe having a subframe index value of n, the UE transmits the first PUSCH in an FDD uplink subframe having a subframe index value of n+4.

The computer-readable medium embodiment, in which the second predefined PUSCH scheduling timing specifies that, in response to the UE receiving a TDD CC uplink grant during a downlink subframe having a subframe index value of n, the UE transmits the second PUSCH in a TDD uplink subframe having a subframe index value of n+k, where k≥4 and where k is based on a preconfigured TDD configuration type of the TDD CC.

The computer-readable medium embodiment, in which the first predefined PUSCH HARQ timing specifies that a PUSCH on the FDD CC during a subframe index value of n has an associated HARQ message on the first PHICH during a subframe index value of n+4.

The computer-readable medium embodiment, in which the second predefined PUSCH HARQ timing specifies that a PUSCH on the TDD CC during a subframe index value of n has an associated HARQ message on the second PHICH during a subframe index value of n+k, where k≥4 and where k is based on a preconfigured TDD configuration of the TDD CC.

The computer-readable medium embodiment, in which the FDD and TDD CCs are provided by co-located evolved universal terrestrial radio access network node Bs.

In still another embodiment, a user equipment (UE) configured for cross-carrier scheduled carrier aggregation comprises:

circuitry configured to:

decode a physical hybrid automatic repeat request (HARQ) indicator channel (PHICH) or a physical downlink control channel (PDCCH) in a scheduling cell having a first duplex mode, to obtain information scheduling subsequent PUSCHs, the subsequent PUSCHs including a first PUSCH in the scheduling cell and a second PUSCH on a scheduled cell having a second duplex mode that is different from the first duplex mode;

detect from the PHICH, a first HARQ in response to the first PUSCH, in which the first HARQ is detected according to a first predefined HARQ timing corresponding to the first duplex mode; and detect from the PHICH, a second HARQ in response to the second PUSCH, in which the second HARQ is detected according to a second predefined HARQ timing corresponding to the first duplex mode or a second duplex mode.

The UE embodiment, in which the first duplex mode is an FDD mode and the second duplex mode is a TDD mode.

The UE embodiment, in which the first duplex mode is a TDD mode and the second duplex mode is an FDD mode.

The UE embodiment, in which the first duplex mode is an FDD mode and the second duplex mode is a TDD mode, and in which, in response to the UE receiving during a subframe index value of n a PDCCH or a PHICH transmission associated with the scheduled cell, the second PUSCH is configured to be transmitted according to a predefined FDD PUSCH scheduling during a subframe index value of n+4.

The UE embodiment, in which, in response to the UE receiving during a subframe index value of n a PDCCH or a PHICH associated with the scheduled cell, the second PUSCH is configured to be transmitted during a subframe index value of n+k, where k≥4 and where k is based on a preconfigured TDD configuration type.

The UE embodiment, in which the first duplex mode is an FDD mode and the second duplex mode is a TDD mode, and in which the second predefined HARQ timing corresponds to an FDD mode, in which the second predefined HARQ timing specifies that the second PUSCH transmitted during a subframe index value of n has an associated HARQ message carried in the PHICH during a subframe index value of n+4.

The UE embodiment, in which the second predefined HARQ timing corresponds to a TDD mode, and in which the second predefined HARQ timing specifies that the second PUSCH transmitted during a subframe index value of n has an associated HARQ message carried in the PHICH during a subframe index value of n+k, where k≥4 and where k is based on a preconfigured TDD configuration.

According to another embodiment, a method for cross-carrier scheduled carrier aggregation comprises:

decoding a physical hybrid automatic repeat request (HARQ) indicator channel (PHICH) or a physical downlink control channel (PDCCH) in a scheduling cell having a first duplex mode, to obtain information scheduling subsequent PUSCHs, the subsequent PUSCHs including a first PUSCH in the scheduling cell and a second PUSCH on a scheduled cell having a second duplex mode that is different from the first duplex mode;

detecting from the PHICH, a first HARQ in response to the first PUSCH, in which the first HARQ is detected according to a first predefined HARQ timing corresponding to the first duplex mode; and detecting from the PHICH, a second HARQ in response to the second PUSCH, in which the second HARQ is detected according to a second predefined HARQ timing corresponding to the first duplex mode or a second duplex mode.

The method embodiment, in which the first duplex mode is an FDD mode and the second duplex mode is a TDD mode.

The method embodiment, in which the first duplex mode is a TDD mode and the second duplex mode is an FDD mode.

The method embodiment, in which the first duplex mode is an FDD mode and the second duplex mode is a TDD mode, and in which, in response to the UE receiving during a subframe index value of n a PDCCH or a PHICH transmission associated with the scheduled cell, the second PUSCH is configured to be transmitted according to a predefined FDD PUSCH scheduling during a subframe index value of n+4.

The method embodiment, in which, in response to the UE receiving during a subframe index value of n a PDCCH or a PHICH associated with the scheduled cell, the second PUSCH is configured to be transmitted during a subframe index value of n+k, where k≥4 and where k is based on a preconfigured TDD configuration type.

The method embodiment, in which the first duplex mode is an FDD mode and the second duplex mode is a TDD mode, in which the second predefined HARQ timing corresponds to an FDD mode, in which the second predefined HARQ timing specifies that the second PUSCH transmitted during a subframe index value of n has an associated HARQ message carried in the PHICH during a subframe index value of n+4.

The method embodiment, in which the second predefined HARQ timing corresponds to a TDD mode, and in which the second predefined HARQ timing specifies that the second PUSCH transmitted during a subframe index value of n has an associated HARQ message carried in the PHICH during a subframe index value of n+k, where k≥4 and where k is based on a preconfigured TDD configuration.

In still another embodiment, a computer-readable medium for cross-carrier scheduled carrier aggregation has stored thereon, computer-executable instructions executable by a user equipment (UE) to cause the UE to:

decode a physical hybrid automatic repeat request (HARQ) indicator channel (PHICH) or a physical downlink control channel (PDCCH) in a scheduling cell having a first duplex mode, to obtain information scheduling subsequent PUSCHs, the subsequent PUSCHs including a first PUSCH in the scheduling cell and a second PUSCH on a scheduled cell having a second duplex mode that is different from the first duplex mode;

detect from the PHICH, a first HARQ in response to the first PUSCH, in which the first HARQ is detected according to a first predefined HARQ timing corresponding to the first duplex mode; and detect from the PHICH, a second HARQ in response to the second PUSCH, in which the second HARQ is detected according to a second predefined HARQ timing corresponding to the first duplex mode or a second duplex mode.

The computer-readable medium embodiment, in which the first duplex mode is an FDD mode and the second duplex mode is a TDD mode.

The computer-readable medium embodiment, in which the first duplex mode is a TDD mode and the second duplex mode is an FDD mode.

The computer-readable medium embodiment, in which the first duplex mode is an FDD mode and the second duplex mode is a TDD mode, in which, in response to the UE receiving during a subframe index value of n a PDCCH or a PHICH transmission associated with the scheduled cell, the second PUSCH is configured to be transmitted according to a predefined FDD PUSCH scheduling during a subframe index value of n+4.

The computer-readable medium embodiment, in which, in response to the UE receiving during a subframe index value of n a PDCCH or a PHICH associated with the scheduled cell, the second PUSCH is configured to be transmitted during a subframe index value of n+k, where k≥4 and where k is based on a preconfigured TDD configuration type.

The computer-readable medium embodiment, in which the first duplex mode is an FDD mode and the second duplex mode is a TDD mode, and in which the second predefined HARQ timing corresponds to an FDD mode, in which the second predefined HARQ timing specifies that the second PUSCH transmitted during a subframe index value of n has an associated HARQ message carried in the PHICH during a subframe index value of n+4.

The computer-readable medium embodiment, in which the second predefined HARQ timing corresponds to a TDD mode, and in which the second predefined HARQ timing specifies that the second PUSCH transmitted during a subframe index value of n has an associated HARQ message carried in the PHICH during a subframe index value of n+k, where k≥4 and where k is based on a preconfigured TDD configuration.

In another embodiment, a user equipment (UE) for time division duplex (TDD) and frequency division duplex (FDD) joint operation comprises means for:

receiving a first physical downlink shared channel (PDSCH) transmission on an FDD component carrier (CC) provided by a first evolved universal terrestrial radio access network node B (eNB);

receiving a second PDSCH transmission on a TDD CC provided by a second eNB;

generating a first hybrid automatic repeat request (HARQ) bits message for the first eNB in response to receiving the first PDSCH;

generating a second HARQ bits message for the second eNB in response to receiving the second PDSCH;

transmitting the first HARQ bits message in a first uplink subframe of the FDD CC according to a predefined HARQ timing for an FDD long term evolution (LTE) system; and transmitting the second HARQ bits message in a second uplink subframe on the FDD CC according to the predefined HARQ timing.

In still another embodiment, a user equipment (UE) for wireless communication according to a time division duplex (TDD) and frequency division duplex (FDD) TDD-FDD carrier aggregation (CA) (TDD-FDD CA) configuration comprises means for:

transmitting a first physical uplink shared channel (PUSCH) on an FDD CC component carrier (CC) of the TDD-FDD CA configuration during a first subframe corresponding to a first predefined PUSCH scheduling timing;

transmitting a second PUSCH on a TDD CC of the TDD-FDD CA configuration during a second subframe corresponding to a second predefined PUSCH scheduling timing, in which the first predefined PUSCH scheduling timing is different from the second predefined PUSCH scheduling timing;

detecting on the FDD CC, according to a first predefined PUSCH hybrid automatic repeat request (HARQ) timing, a first physical HARQ indicator channel (PHICH) associated with the first PUSCH; and detecting on the TDD CC, according to a second predefined PUSCH HARQ timing, a second PHICH associated with the second PUSCH, in which the first predefined PUSCH HARQ timing is different from the second predefined PUSCH HARQ timing.

In another embodiment, a user equipment (UE) for cross-carrier scheduled carrier aggregation comprises means for:

decoding a physical hybrid automatic repeat request (HARQ) indicator channel (PHICH) or a physical downlink control channel (PDCCH) in a scheduling cell having a first duplex mode, to obtain information scheduling subsequent PUSCHs, the subsequent PUSCHs including a first PUSCH in the scheduling cell and a second PUSCH on a scheduled cell having a second duplex mode that is different from the first duplex mode;

detecting from the PHICH, a first HARQ in response to the first PUSCH, in which the first HARQ is detected according to a first predefined HARQ timing corresponding to the first duplex mode; and detecting from the PHICH, a second HARQ in response to the second PUSCH, in which the second HARQ is detected according to a second predefined HARQ timing corresponding to the first duplex mode or a second duplex mode.

It will be understood by skilled persons that many changes may be made to the details of the above-described embodiments without departing from the underlying principles of the invention. The scope of the present invention should, therefore, be determined only by the following claims.

The invention claimed is:

1. A user equipment (UE) configured for cross-carrier scheduled carrier aggregation, the UE comprising:
    circuitry configured to:
        decode a physical hybrid automatic repeat request (HARQ) indicator channel (PHICH) or a physical downlink control channel (PDCCH) in a scheduling cell to obtain information for scheduling physical uplink shared channels (PUSCHs), the PUSCHs including a first PUSCH in the scheduling cell and a second PUSCH in a scheduled cell, the scheduling cell having a first duplex mode, the scheduled cell having a second duplex mode that is different from the first duplex mode;
        detect from the PHICH, a first HARQ in response to the first PUSCH, in which the first HARQ is detected according to a first predefined HARQ timing corresponding to the first duplex mode; and
        detect from the PHICH, a second HARQ in response to the second PUSCH, in which the second HARQ is detected according to a second predefined HARQ timing corresponding to the first duplex mode or the second duplex mode, in which, in response to the UE receiving during a subframe index value of n a PDCCH or a PHICH associated with the scheduled cell, the second PUSCH is configured to be transmitted during a subframe index value of n+k, where k≥4 and where k is based on a preconfigured time division duplex (TDD) configuration type.

2. The UE of claim 1, in which the first duplex mode is a frequency division duplex (FDD) mode and the second duplex mode is a TDD mode.

3. The UE of claim 2, in which the second predefined HARQ timing corresponds to an FDD mode, in which the second predefined HARQ timing specifies that the second PUSCH transmitted during the subframe index value of n has an associated HARQ message carried in the PHICH during a subframe index value of n+4.

4. The UE of claim 2, in which the second predefined HARQ timing corresponds to a TDD mode, and in which the second predefined HARQ timing specifies that the second PUSCH transmitted during the subframe index value of n has an associated HARQ message carried in the PHICH during the subframe index value of n+k.

5. The UE of claim 1, in which the first duplex mode is a TDD mode and the second duplex mode is a frequency division duplex (FDD) mode.

6. The UE of claim 5, in which the second predefined HARQ timing corresponds to the TDD mode, and in which the second predefined HARQ timing specifies that the second PUSCH transmitted during the subframe index value of n has an associated HARQ message carried in the PHICH during the subframe index value of n+k.

7. A user equipment (UE) configured for cross-carrier scheduled carrier aggregation, the UE comprising:
    circuitry configured to:
        decode a physical hybrid automatic repeat request (HARQ) indicator channel (PHICH) or a physical downlink control channel (PDCCH) in a scheduling cell to obtain information for scheduling physical uplink shared channels (PUSCHs), the PUSCHs including a first PUSCH in the scheduling cell and a second PUSCH in a scheduled cell, the scheduling cell having a first duplex mode, the scheduled cell having a second duplex mode that is different from the first duplex mode;
        detect from the PHICH, a first HARQ in response to the first PUSCH, in which the first HARQ is detected according to a first predefined HARQ timing corresponding to the first duplex mode; and
        detect from the PHICH, a second HARQ in response to the second PUSCH, in which the second HARQ is detected according to a second predefined HARQ timing that corresponds to a time division duplex (TDD) mode, and in which the second predefined HARQ timing specifies that the second PUSCH transmitted during a subframe index value of n has an associated HARQ message carried in the PHICH during a subframe index value of n+k, where k≥4 and where k is based on a preconfigured TDD configuration type.

8. The UE of claim 7, in which the first duplex mode is a frequency division duplex (FDD) mode and the second duplex mode is the TDD mode.

9. The UE of claim 8, in which, in response to the UE receiving during the subframe index value of n a PDCCH or a PHICH associated with the scheduled cell, the second PUSCH is configured to be transmitted during the subframe index value of n+k.

10. The UE of claim 7, in which the first duplex mode is the TDD mode and the second duplex mode is a frequency division duplex (FDD) mode.

11. The UE of claim 10, in which, in response to the UE receiving during the subframe index value of n a PDCCH or a PHICH associated with the scheduled cell, the second PUSCH is configured to be transmitted during the subframe index value of n+k.

12. The UE of claim 7, in which, in response to the UE receiving during the subframe index value of n a PDCCH or a PHICH associated with the scheduled cell, the second PUSCH is configured to be transmitted during the subframe index value of n+k.

* * * * *